(12) United States Patent
Tian (10) Patent No.: US 9,020,545 B2
(45) Date of Patent: Apr. 28, 2015

(54) LINK ADAPTATION METHOD, BASE STATION AND TERMINAL IN LTE SYSTEM

(75) Inventor: Feng Tian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 679 days.

(21) Appl. No.: 13/201,405

(22) PCT Filed: Aug. 17, 2010

(86) PCT No.: PCT/CN2010/076060
§ 371 (c)(1),
(2), (4) Date: Aug. 12, 2011

(87) PCT Pub. No.: WO2011/150592
PCT Pub. Date: Dec. 8, 2011

(65) Prior Publication Data
US 2012/0135778 A1    May 31, 2012

(30) Foreign Application Priority Data
Jun. 2, 2010 (CN) .......................... 2010 1 0196425

(51) Int. Cl.
*H04B 17/00* (2006.01)
*H04L 1/00* (2006.01)
*H04W 52/26* (2009.01)

(52) U.S. Cl.
CPC ............ *H04L 1/0009* (2013.01); *H04L 1/0003* (2013.01); *H04L 2001/0092* (2013.01); *H04W 52/262* (2013.01); *H04B 17/318* (2015.01)

(58) Field of Classification Search
CPC .................................................... H04W 4/025
USPC ........... 455/501, 522, 524, 525, 67.11, 68, 69
See application file for complete search history.

(56) References Cited

U.S. PATENT DOCUMENTS

| | | | |
|---|---|---|---|
| 2002/0085519 A1* | 7/2002 | Virtanen ....................... | 370/335 |
| 2002/0177443 A1* | 11/2002 | Tokuyoshi ................... | 455/435 |
| 2008/0084848 A1* | 4/2008 | Jard et al. ..................... | 370/332 |
| 2010/0226340 A1* | 9/2010 | Tayloe et al. ................. | 370/332 |

(Continued)

FOREIGN PATENT DOCUMENTS

| | | |
|---|---|---|
| CN | 101087287 | 12/2007 |
| CN | 101123812 A | 2/2008 |
| CN | 101278533 | 10/2008 |
| CN | 101534518 | 9/2009 |
| JP | 2008042547 | 2/2008 |
| JP | 2009278661 | 11/2009 |

(Continued)

OTHER PUBLICATIONS

International Search Report for International Patent Application No. PCT/CN2010/076060 dated Mar. 10, 2011.

*Primary Examiner* — Wen Huang
(74) *Attorney, Agent, or Firm* — Pearl Cohen Zedek Latzer Baratz LLP (57) ABSTRACT

The present invention discloses a link adaptation method, a base station and a terminal in a LTE system, wherein the method comprises: a terminal respectively calculating differences between a measured reference signal received power (RSRP) of a home service cell and the RSRPs of multiple adjacent cells; the terminal reporting the maximum difference in the differences to a base station; and the base station determining a modulation and coding scheme (MCS) for the terminal according to the maximum difference. The present invention does not introduce new overhead of the system, simplifies the flow of the AMC, and therefore improves the frequency spectrum efficiency of the system.

11 Claims, 3 Drawing Sheets

(56) References Cited

U.S. PATENT DOCUMENTS

2010/0322202 A1* 12/2010 Ohta ............................. 370/336
2011/0069786 A1* 3/2011 Sahara ......................... 375/316
2012/0108232 A1* 5/2012 Viering et al. ................ 455/424

FOREIGN PATENT DOCUMENTS

| JP | 2010045550 A | 2/2010 |
|----|--------------|--------|
| WO | WO2005/046152 | 5/2005 |
| WO | WO 2007/037412 | 4/2007 |

* cited by examiner

LINK ADAPTATION METHOD, BASE STATION AND TERMINAL IN LTE SYSTEM

CROSS-REFERENCE TO RELATED APPLICATIONS

This application is a National Phase Application of PCT International Patent Application No. PCT/CN2010/076060, International Filing Date Aug. 17, 2010, which claimed priority from Chinese Patent Application No. 201010196425.6 filed on Jun. 2, 2010, which is incorporated herein by reference.

FIELD OF THE INVENTION

The present invention relates to communication field, and in particular to a link adaptation method, a base station and a terminal in a long term evolution (LTE) system.

BACKGROUND OF THE INVENTION

Link adaptation technology is a technology produced for overcoming the time-variance of a wireless channel and utilizing the system resources effectively. A main advantage of the link adaptation technology is to improve the reliability of communications, the utilization rate of power resources and frequency, and the throughput of a system. The link adaptation in a LTE system mainly includes two manners which are adaptive modulation and coding (AMC) and power control. In the manners, the AMC refers to determining channel capacity according to condition of a channel, and dynamically adjusting a modulation and coding scheme according to the channel capacity, which can send information to the greatest extent, realize a higher data rate and improve frequency spectrum efficiency of a link, so as to increase the overall throughput of the system.

In the link adaptation technology used in a downlink direction, a modulation and coding scheme (MCS) is correspondingly found from a predefined a channel quality indicator (CQI) table based on a CQI fed back by a user equipment (UE). In order to save overhead of an uplink control channel, the CQI is fed back in combination with other uplink feedbacks, such as a precoding matrix indicator (PMI) and a rank indication (RI). The feedback can be divided into periodic feedback and non-periodic feedback in terms of time. The feedback may use a physical uplink control channel (PUCCH) or a physical uplink shared channel (PUSCH). The link adaptation technology used in an uplink direction directly determines a specific MCS based on an uplink channel quality measured by a base station.

Adaptive power control technology mainly adopts two universal uplink power control methods wherein the first one is to fully utilize residual power of a user, and improve signal quality of the user by increasing a transmit power, and an MCS with a higher order is preferably selected to maximize the throughput of a cell; and the second one is to control power density of a user received by a base station at a given level to restrain the interference of cells and improve the robustness of the signal environment of the cell and the performances of the whole network.

However, in the application of adaptive modulation and coding technology in the related art, in order to realize the link adaptation, a terminal is required to additionally measure a downlink channel quality (CQI) and report the measured downlink channel quality to a base station in uplink transmission, and the base station uses the CQI to find an MCS in a corresponding lookup table, which leads to a complicated flow, therefore and moreover, the terminal is required to measure an CQI additionally and specifically, so as to increase the overhead of the system.

SUMMARY OF THE INVENTION

A main object of the present invention is to provide a link adaptation method, a base station and a terminal in a LTE system to solve the above problem.

According to an aspect of the present invention, a link adaptation method is provided, which comprises: a terminal respectively calculating differences between a measured reference signal received power (RSRP) of a home service cell and the RSRPs of multiple adjacent cells; the terminal reporting the maximum difference in the differences to a base station; and the base station determining a modulation and coding scheme (MCS) for the terminal according to the maximum difference.

Further, while determining the MCS for the terminal, the base station further determines a code rate corresponding to the MCS of the terminal.

Further, the step of the base station determining the MCS for the terminal and the code rate corresponding to the MCS according to the maximum difference comprises: the base station finding the MCS corresponding to the maximum difference and the code rate corresponding to the MCS in a pre-established correspondence relation table, wherein the correspondence relation table stores MCSs corresponding to the respective differences and code rates corresponding to the respective MCSs.

Further, after the step of the base station determining the MCS for the terminal and the code rate corresponding to the MCS according to the maximum difference, the method further comprises: the base station determining a transmit power variation value of the terminal using the MCS, the code rate corresponding to the MCS and a current power headroom report (PHR) of the terminal, wherein the transmit power variation value is used for the terminal to adjust the current transmit power.

Further, the step of the base station determining the transmit power variation value of the terminal using the MCS, the code rate corresponding to the MCS and the current PHR of the terminal comprises that: the base station determines, using the MCS and the code rate corresponding to the MCS, the minimum transmit power required by the terminal to reach the code rate, which comprises: the base station determining, using the MCS and the code rate corresponding to the MCS, the minimum signal-to-noise ratio (SNR) required for reaching the code rate, and then determining the minimum transmit power required by the terminal to reach the minimum SNR; and the base station determines the transmit power variation value of the terminal using the minimum transmit power and the current PHR of the terminal.

Further, after the step of the base station determining the transmit power variation value of the terminal, the method further comprises: the base station sending the transmit power variation value to the terminal by a transmit power control (TPC) command.

Further, the terminal reports the maximum difference to the base station by a measurement report.

According to another aspect of the present invention, a base station is provided, which comprises: a receiving module, adapted to receive a maximum difference reported by a terminal, wherein the maximum difference is the maximum one in multiple differences which are obtained by the terminal respectively calculating differences between a measured reference signal received power (RSRP) of a home service cell and the PSRPs of multiple adjacent cells; and an MCS determining module, adapted to determine a modulation and coding scheme (MCS) for the terminal according to the maximum difference.

Further, the MCS determining module is further adapted to determine a code rate corresponding to the MCS of the terminal while determining the MCS for the terminal.

Further, the base station further comprises: a variation value determining module, adapted to determine a transmit power variation value of the terminal using the MCS and the code rate corresponding to the MCS determined by the MCS determining module, and a current power headroom report (PHR) of the terminal, wherein the transmit power variation value is used for the terminal to adjust the current transmit power.

According to still another aspect of the present invention, a terminal is provided, which comprises: a calculating module, adapted to respectively calculate differences between a measured reference signal received power (RSRP) of a home service cell and the RSRPs of multiple adjacent cells; and a sending module, adapted to report the maximum difference to a base station, so that the base station determines a transmit power variation value, a modulation and coding scheme (MCS) of the terminal and a code rate corresponding to the MCS, according to the maximum difference.

By the present invention, since existing measurement parameters (RSRPs of the service cell and the adjacent cells) are directly utilized, required parameters can be obtained as long as the terminal performs normal measurements. As the measurement is a process which the terminal has to perform, so that additional CQI measurement is not required, and therefore additional system overhead is not introduced, the flow of the AMC is simplified, and thus the frequency spectrum efficiency of the system is improved.

BRIEF DESCRIPTION OF THE DRAWINGS

The accompanying drawings illustrated herein are provided for further understanding the present invention, and form a part of the application. The exemplary embodiments of the present invention and the description thereof are used for explaining the present invention but not unduly limiting the present invention. In the accompanying drawings.

DETAILED DESCRIPTION OF THE EMBODIMENTS

The present invention will be described in detail hereinafter by reference to the accompanying drawings in conjunction with embodiments. It should be noted that the embodiments of the present invention and the features thereof can be combined with each other if no conflict is caused.

A LTE system comprises a UE and a base station, wherein the UE and the base station adopt link adaptation technology (including AMC and power control) to overcome the time-variance of a wireless channel and utilize the system resources effectively. The following embodiments of the present invention are realized in the LTE system.

Figure 1:
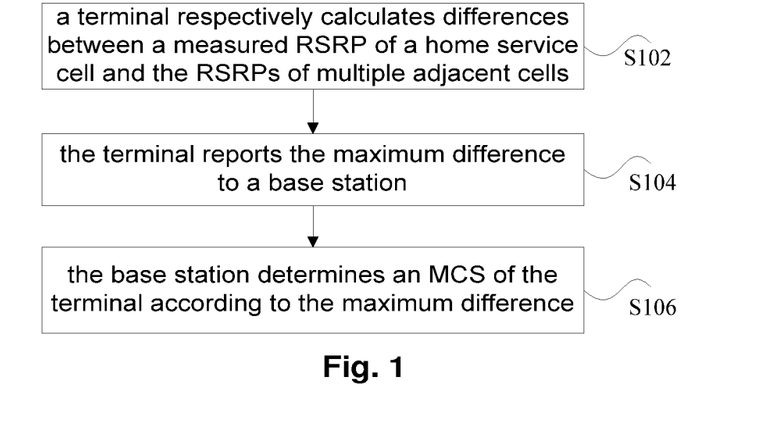
FIG. 1 is a flow chart of a link adaptation method in a LTE system according to an embodiment of the present invention.

FIG. 1 is a flow chart of a link adaptation method in a LTE system according to an embodiment of the present invention. The method comprises the following steps.

Step S102, a terminal respectively calculates differences between a measured RSRP (Reference Signal Received Power) of a home service cell and the RSRPs of multiple adjacent cells.

For instance, after accessing a cell (referred to as a home service cell of the terminal or a service cell of the terminal), the terminal is required to measure the value of the RSRPs of the service cell and adjacent cells continuously, therefore the terminal can process the obtained RSRPs.

Step 1, the terminal performs measurement according to a pre-configured number N (N is a predetermined value which can be configured during the configuration of initial parameters of the system) of the adjacent cells which are required to be measured to obtain the values of RSRPs of respective adjacent cells and store the values of the RSRPs. The values of the RSRPs of the N adjacent cells can be recorded as RSRP1, RSRP2, . . . RSRPN.

Step 2, the terminal measures the value of a RSRP of the service cell and stores the value. The RSRP of the service cell can be recorded as RSRP0.

Step 3, differences between RSRP0 and RSRP1, RSRP2, . . . RSRPN are respectively calculated and respectively recorded as $\Delta RSRP1, \Delta RSRP2, \ldots \Delta RSRPn$.

Step S104: the terminal reports the maximum difference to a base station.

For instance, the maximum value $\max\{\Delta RSRP1, \Delta RSRP2, \ldots \Delta RSRPn\}$ is selected from the $\Delta RSRP1, \Delta RSRP2, \ldots \Delta RSRPn$ calculated in the step S102. For example, the maximum value is recorded as the maximum $\Delta RSRP$, and then the maximum $\Delta RSRP$ is reported to the base station.

Step S106, the base station determines an MCS of the terminal according to the maximum difference.

For instance, the base station can substantially determine the location of the terminal in the service cell according to the maximum difference, wherein the greater the difference is, the closer the terminal is to the center of the service cell, the better the channel quality is, and the greater MCS that can be used is; whereas, it is indicated that the terminal may be located in the edge of the service cell and the smaller MCS that can be used is. During the specific determination process, a pre-established correspondence relation table can be utilized to make the difference to be mapped to an MCS and a code rate, wherein the correspondence relation table can be obtained by a simulation or a test.

In order to realize a link adaptation in the related art, a terminal is required to measure a CQI specially and additionally, which result in that the realization flow is relatively complicated and the system overhead is increased. Since after accessing a service cell the terminal will continuously measure the RSRPs of the service cell and adjacent cells and the terminal in the embodiment directly utilizes the measurement information to respectively calculate the RSRP differences between the service cell and the adjacent cells and reports the maximum difference (that is, the maximum $\Delta RSRP$, which is capable of indicating the location of the terminal in the service cell) to the base station, the base station can determine a proper MCS utilizing the maximum difference and allocate the proper MCS to the terminal, thus the AMC method used in the link adaptation technology in the LTE system is realized. Since the embodiment directly utilizes the existing measurement parameters (RSRPs of the service cell and the adjacent cells), the required parameters can be obtained as long as the terminal performs normal measurements. As the measurement is a process which the terminal has to perform, additional CQI measurement is not required, and therefore additional system overhead is not introduced, the flow is simplified, and thus the frequency spectrum efficiency of the system is improved.

Preferably, in the step S106, when determining the MCS of the terminal, the base station further determines the code rate corresponding to the MCS of the terminal simultaneously.

The magnitude of the maximum difference in the step S104 can indicate an approximate position of the terminal in the service cell. Therefore, the base station can substantially determine the location of the terminal in the service cell according to the maximum difference, wherein the greater the difference is, the closer the terminal is to the center of the service cell, the better the channel quality is, and the greater MCS that can be used is; whereas, it is indicated that the terminal may be located in the edge of the service cell and the smaller MCS that can be used is. In this preferred embodiment, the base station selects a proper MCS for the terminal according to the maximum ΔRSRP which indicates the location of the terminal in the service cell, and makes the selected MCS to correspond to a specific code rate group, therefore the corresponding code rate group can be used to obtain the minimum transmit power required by the terminal to reach the code rate, so as to provide a basis for a subsequent power control.

Preferably, the step of the base station determining the MCS for the terminal and the code rate corresponding to the MCS according to the maximum difference comprises: the base station finding the MCS corresponding to the maximum difference and the code rate corresponding to the MCS (specifically, which is a code rate group) in a pre-established correspondence relation table, wherein the correspondence relation table stores MCSs corresponding to the respective differences and code rates corresponding to the respective MCSs.

This preferred embodiment provides a specific implementation scheme in which the base station determines a proper MCS and corresponding different code rate for the terminal according to the maximum difference reported by the terminal. The correspondence relation table can be pre-obtained by a simulation or a test. Thus, the base station can determine a proper MCS and a code rate corresponding to the MCS for the terminal easily. Obviously, in the correspondence relation table, a greater difference corresponds to an MCS with a higher order and a greater code rate. Since the maximum difference reported by the terminal reflects the current location of the terminal in the service cell wherein the greater the difference is, the closer the terminal is to the center of the service cell, the better the channel quality is, and the higher the order of the MCS selected for the terminal according to the correspondence relation table is and the greater the code rate is, the data transmission rate can be improved; whereas, it is indicated that the terminal is closer to the edge of the service cell, the channel quality is worse, and the order of the MCS selected for the terminal is lower and the code rate is small, so that the reliability of the data transmission of the system is improved, and furthermore, the throughput of the system can be increased.

In practical implementation, it is possible that difference intervals with different interval range correspond to different MCS in the correspondence relation table above, that is, one difference interval corresponds to one MCS.

Preferably, after the base station determines the MCS for the terminal and the code rate corresponding to the MCS according to the maximum difference, it is further comprised that the base station determines a transmit power variation value of the terminal using the MCS, the code rate corresponding to the MCS and a current PHR (Power Headroom Report) of the terminal, wherein the transmit power variation value is used for the terminal to adjust the current transmit power.

In this preferred embodiment, the base station determines, in combination with the PHR reported by the terminal, the transmit power variation value (a transmit power value which needs to be increased or a transmit power value which needs to be decreased) required to be adjusted by the terminal under the code rate corresponding to the MCS, and the terminal can adjust its own transmit power properly, so as to realize the power control in the link adaptation technology, which guarantees the throughput, and simultaneously can reduce transmit power, restrain cell interference and reduces the energy consumption of the terminal.

Preferably, the step of the base station determining the transmit power variation value of the terminal using the MCS, the code rate corresponding to the MCS and the current PHR of the terminal comprises the following steps:

step 1, the base station determines, using the MCS determined above and the code rate corresponding to the MCS, the minimum transmit power required by the terminal to reach the code rate, which comprises: the base station determining, using the MCS and the code rate corresponding to the MCS, the minimum signal-to-noise ratio (SNR) required for reaching the code rate, and then determining the minimum transmit power required by the terminal to reach the minimum SNR; and step 2, the base station determines the transmit power variation value of the terminal using the minimum transmit power and the current PHR of the terminal.

This preferred embodiment provides a specific implementation scheme in which the base station obtains the minimum transmit power available for the terminal according to the determined MCS of the terminal and the code rate corresponding to the MCS, and then obtains the transmit power value (namely, the aforementioned transmit power variation value) adjustable by the terminal in combination with the current PHR of the terminal. In this preferred embodiment, it is only required to process the RSRP values measured by the terminal to obtain a proper MCS, so that the system throughput is met, the interference of the users in a cell is improved and the energy consumption of the terminal is saved.

Preferably, after the step of the base station determining the transmit power variation value of the terminal, it is further comprised that: the base station sends the transmit power variation value to the terminal by a transmit power control (TPC) command. Consequentially, the base station can inform via the TPC command the terminal of a power value which can be increased or decreased, so that the terminal can adjust its own transit power using the transmit power variation value. The power control is realized still using an existing TPC command, so that the system overhead is not increased and the realization is simple.

Preferably, in the step S104, the terminal reports the maximum difference to the base station via a measurement report. Thus, the maximum difference is reported using the existing measurement report, so that the overhead of the uplink control channel is saved.

Apparently, by using the method above, the UE will continuously measure the RSRPs of the service cell and adjacent cells, and the steps S102-S104 are executed continuously. Therefore, the base station can obtain the movement of the UE and the update of measurement results of the latest location of the UE according to the new maximum difference reported by the UE, and then after determining the MCS and the code rate, the minimum power value required for meeting the requirement is obtained, and then in combination with the PHR reported by the terminal, the adjusted power value is informed to the terminal via the TPC command, so as to make the terminal transmit data with the minimum power for meeting the code rate. In this way, the throughput of the system is guaranteed, and at the same time, the energy consumption of the terminal is reduced as much as possible, and the interference among users is reduced as well.

By the flow above, the base station can be made to rationally allocate MCSs and adjusted power values for terminals at different locations.

Embodiment 1

Figure 2:
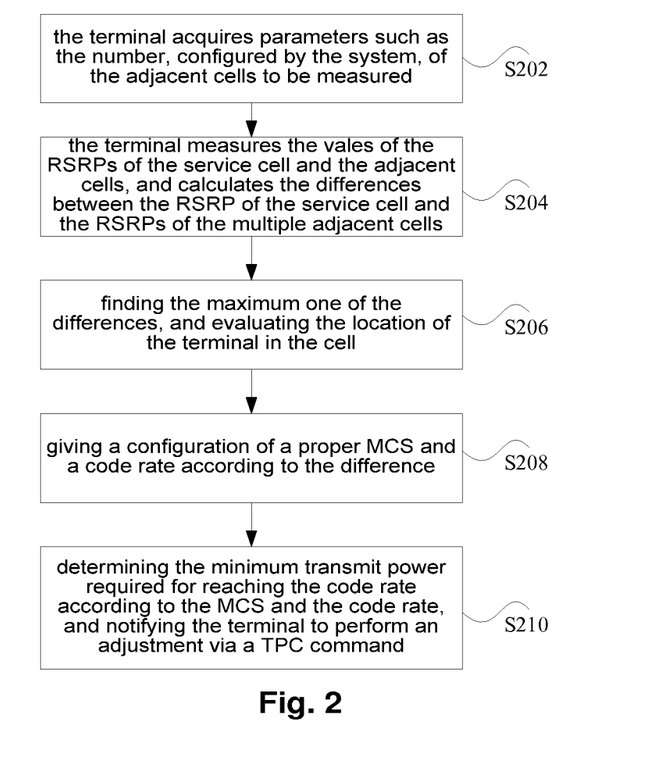
FIG. 2 is a flow chart of a link adaptation method in a LTE system according to an embodiment 1 of the present invention.

As shown in FIG. 2, the specific process flow of a link adaptation method in a LTE system according to an embodiment of the present invention comprises the following steps.

Step S202, a base station configures the number of adjacent cells to be measured by a UE as n, and the UE acquires the number n.

Step S204, the UE measures the value of RSRP (recorded as RSRP0) of a service cell and the values of the RSRPs (recorded as RSRP1, RSRP2, . . . RSRPn) of the n adjacent cells, and then the UE respectively calculates differences between RSRP0 and RSRP1, RSRP2, . . . RSRPn, and respectively records them as $\Delta RSRP1$, $\Delta RSRP2$, . . . $\Delta RSRPn$.

Step S206, the UE selects the maximum one from the multiple differences calculated in the step S204, and records it as $\Delta RSRPmax$, and reports the $\Delta RSRPmax$ to the base station (the $\Delta RSRPmax$ can be carried in a measurement report to report).

Step S208, an MCS value corresponding to the $\Delta RSRPmax$ and suitable for the location of the UE and a code rate corresponding to the MCS are obtained from a correspondence relation table of differences obtained by a simulation and MCSs and code rates corresponding to the MCSs. In a simulation curve (taking $\Delta RSRPmax$ as the abscissa) obtained from the simulation, the greater the $\Delta RSRPmax$ is, the closer the UE is to the center of the service cell, and the higher the order of the MCS obtained correspondingly is, and the higher the code rate is. Thus, if the UE is in the center of the service cell, the UE can be allocated with an MCS with a higher order and a higher code rate, so as to obtain a greater throughput.

Step S210, corresponding to the configuration of the MCS and the code rate, there are corresponding and proper SNR and power value. The base station obtains the minimum SNR required for reaching the code rate according to the MCS and the code rate group obtained in the step S208, and then determines the minimum transmit power required by the terminal to reach the minimum SNR, so as to properly decrease or increase the transmit power of the terminal, which guarantees the throughput of the system while can restrain the interference among the cells.

Embodiment 2

Figure 3:
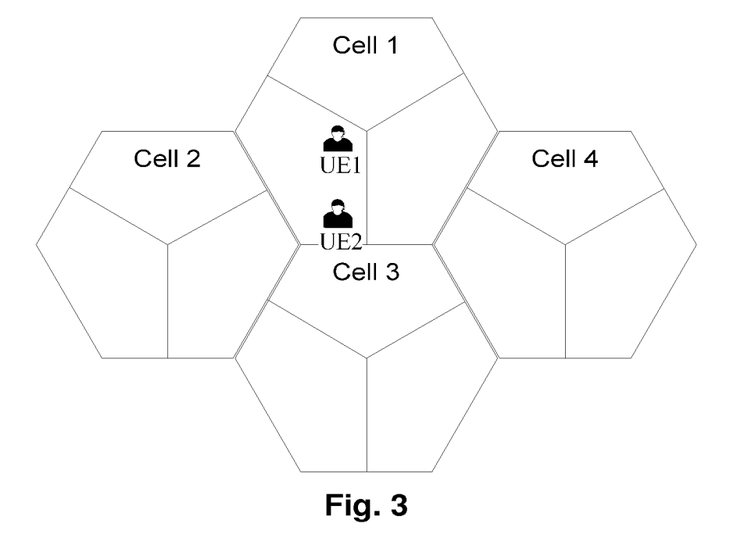
FIG. 3 is a schematic diagram of distribution of cells according to a preferred embodiment of the present invention.

As shown in FIG. 3, there are two UEs in a cell 1, wherein the UEs respectively are a UE1 and a UE2. According to the process manner of the method of the embodiment of the present invention, the two UEs are required to measure the value of the RSRP of a service cell, i.e. the cell 1, and the values of the RSRPs of other three adjacent cells (cell 2, cell 3 and cell 4).

Since the location of the UE1 is closer to the center of the cell, the maximum RSRP difference between the service cell and the adjacent cells of the UE1 should be greater than that of the UE2. Thus, according to a corresponding simulation curve or a correspondence relation table, an MCS and a code rate that a base station can allocate to UE1 should be greater than those to the UE2. It can be guaranteed that the UE1 with a better channel quality is allocated with an MCS with a higher order to improve data transmission rate, whereas the UE2 with a relatively bad channel quality is allocated with an MCS with a lower order and a lower code rate to improve the transmission reliability of the system. Thus, at the same time, the throughput of the system can be guaranteed when a better corresponding MCS being selected.

Embodiment 3

As shown in FIG. 3, during movement of a UE, since the UE periodically measures the RSRP of the present cell (i.e. a service cell) and the RSRPs of adjacent cells, a base station can dynamically acquire a maximum difference reflecting the location of the UE and can configure an MCS and control a power flexibly.

Figure 4:
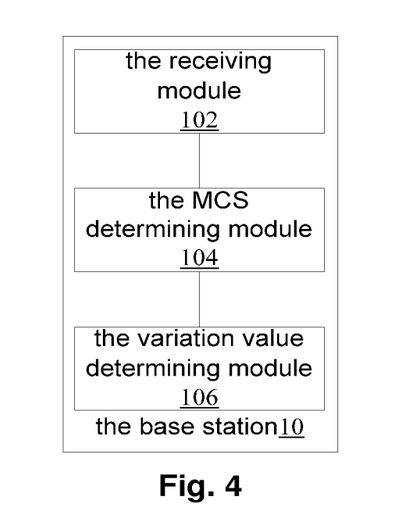
FIG. 4 is the schematic diagram of a base station according to an embodiment of the present invention.

FIG. 4 is a schematic diagram of a base station and a terminal according to an embodiment of the present invention. The base station 10 comprises: a receiving module 102, adapted to receive a maximum difference reported by a terminal 20, wherein the maximum difference is the maximum one in the multiple differences which are obtained by the terminal respectively calculating differences between a measured reference signal received power (RSRP) of a home service cell and the RSRPs of multiple adjacent cells; and an MCS determining module 104, adapted to determine a MCS for the terminal 20 according to the maximum difference.

Preferably, the MCS determining module 104 is further adapted to determine a code rate corresponding to the MCS of the terminal 20 simultaneously with determining the MCS for the terminal.

Preferably, the manner of the MCS determining module 104 determining the MCS for the terminal and the code rate corresponding to the MCS according to the maximum difference is: finding the MCS corresponding to the maximum difference and the code rate corresponding to the MCS in a pre-established correspondence relation table, wherein the correspondence relation table stores MCSs corresponding to the respective differences and code rates corresponding to the respective MCSs.

Preferably, the above base station further comprises: a variation value determining module 106, adapted to determine a transmit power variation value of the terminal using the MCS and the code rate corresponding to the MCS determined by the MCS determining module 104, and a current PHR of the terminal 20, wherein the transmit power variation value is used for the terminal to adjust the current transmit power.

Preferably, the variation value determining module 106 comprises: a minimum transmit power determining module and a transmit power variation value determining module, wherein the minimum transmit power determining module is adapted to determine, using the MCS and the code rate corresponding to the MCS determined by the MCS determining module 104, the minimum transmit power required by the terminal 20 to reach the code rate, wherein the minimum transmit power determining module comprises: a first determining module, adapted to determine, using the MCS and the code rate corresponding to the MCS determined by the MCS determining module 104, the minimum SNR required for reaching the code rate; and a second determining module, adapted to determine the minimum transmit power required by the terminal 20 to reach the minimum SNR; and the transmit power variation value determining module is adapted to determine the transmit power variation value of the terminal using the minimum transmit power and the current PHR of the terminal.

Preferably, the base station 10 further comprises: a sending module, adapted to send to the terminal 20 the transmit power variation value by a TPC command after the variation value determining module 106 determines the transmit power variation value of the terminal.

Figure 5:
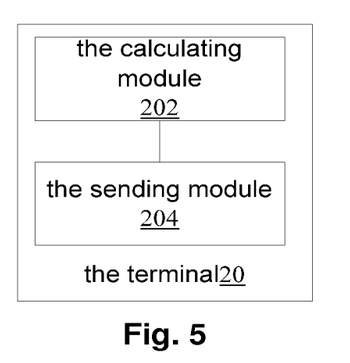
FIG. 5 is the schematic diagram of a terminal according to an embodiment of the present invention.

FIG. 5 is a schematic diagram of a terminal according to an embodiment of the present invention. The terminal 20 comprises: a calculating module 202, adapted to respectively calculate differences between a measured RSRP of a home service cell and the RSRPs of multiple adjacent cells; and a sending module 204, adapted to report the maximum one of the plural differences calculated by the calculating module 202 to a base station 10, so that the base station 10 determines an MCS of the terminal 20, a code rate corresponding to the MCS and a transmit power variation value, according to the maximum difference.

Preferably, the sending module 204 reports the maximum difference to the base station 10 via a measurement report.

It can be concluded from the description above that the present invention achieves the following technical effects.

(1) The AMC method and the power control used in the link adaptation technology in the LTE system are realized.

(2) Since existing measurement parameters (RSRPs of the service cell and the adjacent cells) are directly utilized, required parameters can be obtained as long as the terminal performs normal measurements. As the measurement is a process that the terminal has to perform, additional CQI measurement is not required, and therefore additional system overhead is not introduced, the flow of the AMC is simplified, and thus the frequency spectrum efficiency of the system is improved.

(3) The throughput of the system is guaranteed, and simultaneously the energy consumption of the terminal is reduced as much as possible and the interference among users is reduced.

Apparently, it should be understood by those skilled in the art that the respective modules or the respective steps of the present invention above can be realized by a universal computing device, and can be centralized on a single computing device or distributed on a network consisting of multiple computing devices. Optionally, the respective modules or the respective steps can be realized by program codes executable for the computing device, thus, the respective modules or the respective steps can be stored in a storage device and to be executed by a computing device, furthermore, in some cases, the steps shown or described above can be executed in an order different from that illustrated therein, or can be separately manufactured into integrated circuit modules, or some of the modules or steps can be manufactured into a single integrated circuit module. Thus, the present invention is not limited to any special combination of hardware and software.

The mentioned above is only preferred embodiments of the present invention but not limitation for the invention, various modification and variations can be devised by those skilled in the art. Any modification, equivalent and improvement devised within the spirit and principle of the present invention should be included in the protection scope of the present invention.

The invention claimed is:

1. A link adaptation method in a LTE system, characterized by comprising:
a terminal respectively calculating differences between a measured reference signal received power (RSRP) of a home service cell and the RSRPs of multiple adjacent cells;
the terminal reporting a maximum difference in the differences to a base station; and
the base station determining a modulation and coding scheme (MCS) for the terminal according to the maximum difference;
wherein the maximum difference indicates the position of the terminal in the service cell, and the greater the maximum difference is, the closer the terminal is to the center of the service cell, and the greater the MCS that can be used.

2. The method according to claim 1, wherein while determining the MCS for the terminal, the base station further determines a code rate corresponding to the MCS of the terminal.

3. The method according to claim 2, wherein the step of the base station determining the MCS for the terminal and the code rate corresponding to the MCS according to the maximum difference comprises:
the base station finding the MCS corresponding to the maximum difference and the code rate corresponding to the MCS in a pre-established correspondence relation table, wherein the correspondence relation table stores MCSs corresponding to the respective differences and code rates corresponding to the respective MCSs.

4. The method according to claim 2, wherein after the step of the base station determining the MCS for the terminal and the code rate corresponding to the MCS according to the maximum difference, the method further comprises:
the base station determining a transmit power variation value of the terminal using the MCS, the code rate corresponding to the MCS and a current power headroom report (PHR) of the terminal, wherein the transmit power variation value is used for the terminal to adjust the current transmit power.

5. The method according to claim 4, wherein the step of the base station determining the transmit power variation value of the terminal using the MCS, the code rate corresponding to the MCS and the current PHR of the terminal comprises that:
the base station determines, using the MCS and the code rate corresponding to the MCS, the minimum transmit power required by the terminal to reach the code rate, which comprises:
the base station determining, using the MCS and the code rate corresponding to the MCS, the minimum signal-to-noise ratio (SNR) required for reaching the code rate, and then determining the minimum transmit power required by the terminal to reach the minimum SNR; and
the base station determines the transmit power variation value of the terminal using the minimum transmit power and the current PHR of the terminal.

6. The method according to claim 4, wherein after the step of the base station determining the transmit power variation value of the terminal, the method further comprises: the base station sending the transmit power variation value to the terminal by a transmit power control (TPC) command.

7. The method according to claim 1, wherein the terminal reports the maximum difference to the base station by a measurement report.

8. A base station, comprising:
a receiving module, adapted to receive a maximum difference reported by a terminal, wherein the maximum difference is the maximum one in multiple differences which are obtained by the terminal respectively calculating differences between a measured reference signal received power (RSRP) of a home service cell and the RSRPs of multiple adjacent cells; and
an MCS determining module, adapted to determine a modulation and coding scheme (MCS) for the terminal according to the maximum difference, wherein the maximum difference indicates the position of the terminal in the service cell, the greater the maximum difference is, the closer the terminal is to the center of the service cell, and the greater the MCS that can be used.

9. The base station according to claim 8, wherein the MCS determining module is further adapted to determine a code rate corresponding to the MCS of the terminal while determining the MCS for the terminal.

10. The base station according to claim 9, wherein the base station further comprises:
a variation value determining module, adapted to determine a transmit power variation value of the terminal using the MCS and the code rate corresponding to the MCS determined by the MCS determining module, and a current power headroom report (PHR) of the terminal, wherein the transmit power variation value is used for the terminal to adjust the current transmit power.

11. A terminal, comprising:
a calculating module, adapted to respectively calculate differences between a measured reference signal received power (RSRP) of a home service cell and the RSRPs of multiple adjacent cells; and
a sending module, adapted to report the maximum difference to a base station, so that the base station determines a transmit power variation value, a modulation and coding scheme (MCS) of the terminal and a code rate corresponding to the MCS, according to the maximum difference,
wherein the maximum difference indicates the position of the terminal in the service cell, and the greater the maximum difference is, the closer the terminal is to the center of the service cell, and the greater the MCS that can be used.

* * * * *